United States Patent
Durston et al.

(10) Patent No.: US 10,571,485 B2
(45) Date of Patent: Feb. 25, 2020

(54) ACCELEROMETERS

(71) Applicant: Atlantic Inertial Systems Limited, Plymouth, Devon (GB)

(72) Inventors: Michael Durston, Plymouth (GB); Kevin Townsend, Liskeard (GB)

(73) Assignee: ATLANTIC INERTIAL SYSTEMS, LIMITED, Plymouth, Devon (DE)

(*) Notice: Subject to any disclaimer, the term of this patent is extended or adjusted under 35 U.S.C. 154(b) by 230 days.

(21) Appl. No.: 15/316,679

(22) PCT Filed: Jun. 5, 2015

(86) PCT No.: PCT/GB2015/051643
§ 371 (c)(1),
(2) Date: Dec. 6, 2016

(87) PCT Pub. No.: WO2015/185937
PCT Pub. Date: Dec. 10, 2015

(65) Prior Publication Data
US 2017/0146562 A1   May 25, 2017

(30) Foreign Application Priority Data
Jun. 6, 2014   (GB) .................... 1410038.2

(51) Int. Cl.
*G01P 15/125* (2006.01)
*G01P 15/13* (2006.01)
(Continued)

(52) U.S. Cl.
CPC .......... *G01P 15/125* (2013.01); *G01P 15/131* (2013.01); *G01P 21/00* (2013.01);
(Continued)

(58) Field of Classification Search
CPC ................ G01P 15/125; G01P 2015/0868
(Continued)

(56) References Cited

U.S. PATENT DOCUMENTS 5,351,519 A   10/1994 Kress
5,447,067 A   9/1995 Biebl
(Continued)

FOREIGN PATENT DOCUMENTS

EP   0718631 A2   6/1996
EP   2518441 A2   10/2012
(Continued)

OTHER PUBLICATIONS

GB Search Report for Application No. GB1410038.2. dated Oct. 17, 2014, 4 Pages.
(Continued)

*Primary Examiner* — John E Chapman, Jr.
(74) *Attorney, Agent, or Firm* — Cantor Colburn LLP

(57) ABSTRACT

In a method for open loop operation of a capacitive accelerometer, a first mode of operation comprises electrically measuring a deflection of a proof mass (204) from the null position under an applied acceleration using a pickoff amplifier (206) set to a reference voltage Vcm. A second mode of operation comprises applying electrostatic forces in order to cause the proof mass (204) to deflect from the null position, and electrically measuring the forced deflection so caused. In the second mode of operation the pickoff amplifier (206) has its input (211) switched from Vcm to Vss, using a reference control circuit (209), so that drive amplifiers (210) can apply different voltages Vdd to the proof mass (204) and associated fixed electrodes (202).

11 Claims, 5 Drawing Sheets

(51) Int. Cl.
G01P 21/00 (2006.01)
G01P 15/08 (2006.01)

(52) U.S. Cl.
CPC ............... *G01P 2015/0814* (2013.01); *G01P 2015/0868* (2013.01)

(58) Field of Classification Search
USPC .............................................. 73/514.32, 1.38
See application file for complete search history.

(56) References Cited

U.S. PATENT DOCUMENTS

| | | | |
|---|---|---|---|
| 5,583,290 | A | 12/1996 | Lewis |
| 5,587,518 | A | 12/1996 | Stevenson et al. |
| 7,267,006 | B2 * | 9/2007 | Malvern ............ G01P 1/006 73/514.32 |
| 2006/0005603 | A1 | 1/2006 | Chau |
| 2010/0122565 | A1 | 5/2010 | Miller |
| 2013/0067984 | A1 | 3/2013 | Balachandran |

FOREIGN PATENT DOCUMENTS

| | | |
|---|---|---|
| JP | 07075385 A | 3/1995 |
| JP | 2001197139 A | 7/2001 |
| JP | 2001263755 A | 9/2001 |
| JP | 2003035977 A | 2/2003 |
| JP | 2009075097 A | 4/2009 |
| JP | 2012227420 A | 11/2012 |
| JP | 2013243858 A | 11/2013 |
| JP | WO2012176501 A1 | 2/2015 |
| WO | 0151931 A1 | 7/2001 |
| WO | 2004076340 A1 | 9/2004 |
| WO | 2005083451 A1 | 9/2005 |

OTHER PUBLICATIONS

International Preliminary Report on Patentability for International Application No. PCT/GB2015/051643. dated Sep. 9, 2016. 13 pages.
Notification of Transmittal of the International Search Report and the Written Opinion of the International Searching Authority, or the Declaration; PCT/GB2015/051643; dated Aug. 10, 2015, 12 Pages.
Japanese Office Action Issued in JP Application No. 2017-516220, Drafting Date Sep. 5, 2018, 6 Pages.
Japanese Office Action/Decision to Grant Issued in JP Application No. 2017-516220, dated Aug. 20, 2019, 4 pages.

* cited by examiner

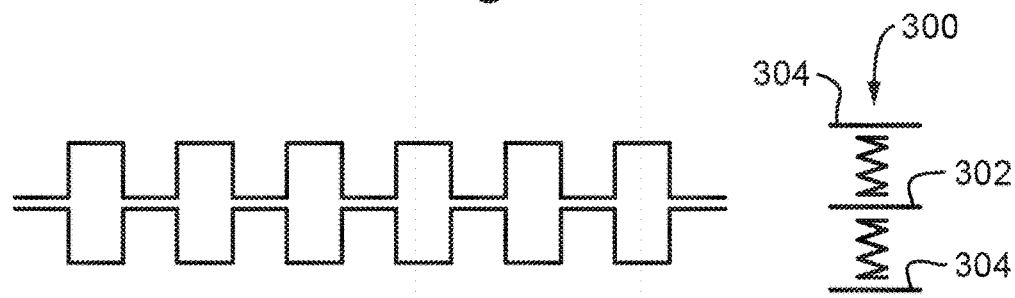
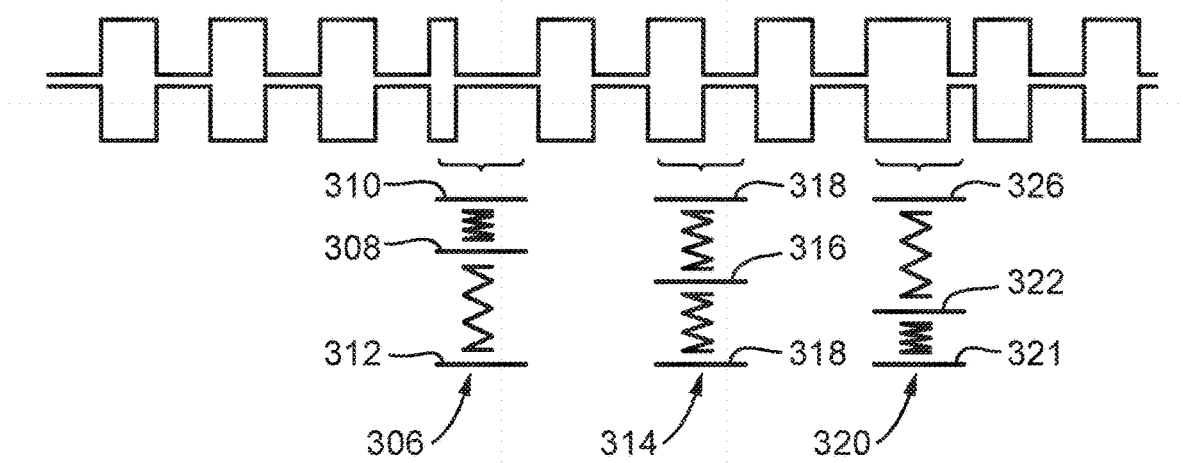

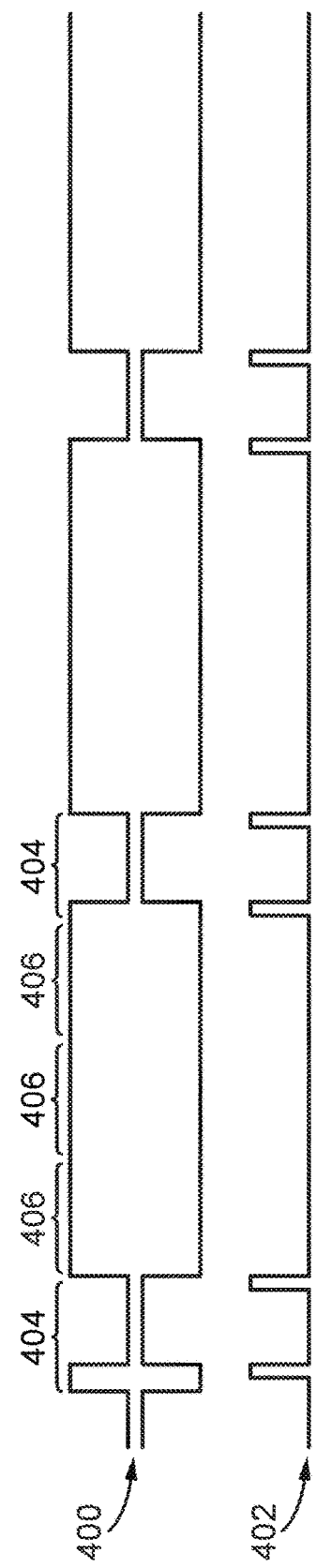

ACCELEROMETERS

CROSS REFERENCE TO RELATED APPLICATIONS

This is a US National Stage of Application No. PCT/GB2015/051643, filed on Jun. 5, 2015, which claims the benefit of GB Application No. 1410038.2 filed Jun. 6, 2014, the disclosures of which are incorporated herein by reference.

TECHNICAL FIELD

The present disclosure relates to capacitive accelerometers, and in particular to methods of testing the sensitivity of an open loop accelerometer.

BACKGROUND

Accelerometers are electromechanical devices that are widely used to measure acceleration forces due to motion and/or vibration. Capacitive accelerometers may find use in applications including seismic sensing, vibration sensing, inertial sensing and tilt sensing. Capacitive accelerometers are typically implemented as micro electromechanical systems (MEMS) and may be manufactured from a semiconductor material such as silicon. A typical MEMS sensing structure for a capacitive accelerometer comprises a proof mass moveably mounted to a support, with a set of electrode fingers extending from the proof mass being interdigitated with one or more sets of fixed electrode fingers so as to form a differential capacitor. WO 2004/076340 and WO 2005/083451 provide examples of capacitive accelerometers comprising a plurality of interdigitated fixed and moveable electrode fingers extending substantially perpendicular to the sensing direction of the MEMS device. The electrodes of the sensing structure are connected to suitable drive and pickoff electronics.

In a closed loop configuration, the electronics are arranged to drive the fixed electrode fingers with modulated voltage signals which produce variable electrostatic forces to balance the inertial forces so that the proof mass does not move under acceleration. This is achieved using a feedback signal to adjust the drive signals. WO 2004/076340 provides an example of an accelerometer operated in a closed loop configuration using pulse width modulation (PWM) of the drive signals. The mark:space ratio of the PWM signals can be adjusted to produce a variable rebalance force. Although sensitivity can be controlled in closed loop accelerometers, the necessary drive electronics and feedback loop increase the complexity and cost of the device.

In open loop operation of an accelerometer, the proof mass is free to move under acceleration, and this movement produces an output ("pickoff") signal which can be rectified to produce a voltage representing the acceleration. The electronics are arranged to drive the fixed electrode fingers with a constant sine or square wave signal. Open loop accelerometers are often chosen for their simplicity in design to provide a low cost device.

The sensitivity of an accelerometer is the ratio of change in acceleration to change in the output signal. The sensitivity of the accelerometer to acceleration is assumed to be constant, such that a set signal (and therefore a set movement) represents a set acceleration. However, the actual sensitivity may change during use. For example, if the proof mass were to become mechanically damaged during use, the sensitivity of the accelerometer would change. An accelerometer is a spring mass system, where deflection is dependent on both the mass (of the proof mass and moveable fingers) and the stiffness of the support legs. The output voltage depends on the displacement of the proof mass and the gain of the accelerometer (e.g. the number and size of the moveable fingers), meaning that there are two ways in which an error can be introduced into the output.

For example, if an electrode finger or support leg for the proof mass were to crack, the electrical output or the amount of deflection produced by a set acceleration would be altered, both by the displacement changing due to the changed stiffness of the finger/leg, and due to the gain changing. However, the electronics would not be aware of the change in electrical or mechanical sensitivity, and would therefore produce incorrect measurements. It is therefore desirable to be able to test the sensitivity of an accelerometer during use.

In current open loop accelerometers, it is possible to perform a check on the electronics in the acceleration sensing system, e.g. in order to check the integrity of the electrical pickoff signal. However, this check is carried out downstream of the physical measurement, so cannot take into account the mechanical sensitivity of the accelerometer having changed.

The required sensitivity of an accelerometer depends on the application of the accelerometer, and the g-range in use. In low-g applications, changes in the sensitivity would have a greater impact. For example, in automotive applications, accelerometers may be used in determining when airbags are needed. If an accelerometer has a cracked support leg/spring (or other mounting for the proof mass), it may cause a large deflection for only a small acceleration, causing the airbags to be activated unnecessarily. This can be dangerous, and therefore it is important that the sensitivity of the accelerometer is known, and any changes in sensitivity can be detected during use.

The present disclosure seeks to provide sensitivity testing for capacitive accelerometers operating in an open loop configuration.

SUMMARY

According to a first aspect of this disclosure there is provided a method for open loop operation of a capacitive accelerometer, the capacitive accelerometer comprising:
  a substantially planar proof mass mounted to a fixed substrate by flexible support legs so as to be linearly moveable in an in-plane sensing direction in response to an applied acceleration;
  first and second sets of moveable capacitive electrode fingers extending from the proof mass, substantially perpendicular to the sensing direction and spaced apart in the sensing direction; and
  first and second sets of fixed capacitive electrode fingers extending substantially perpendicular to the sensing direction and spaced apart in the sensing direction;
  wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
  wherein a null position is defined as a spacing of the interdigitated fixed and moveable capacitive electrode fingers when the applied acceleration is zero;

the method comprising:
a first mode of operation which comprises electrically measuring a deflection of the proof mass including the moveable capacitive electrode fingers from the null position under an applied acceleration; and
a second mode of operation which comprises applying electrostatic forces to said first and second sets of fixed capacitive electrode fingers, in order to cause said proof mass including the first and second sets of moveable capacitive electrode fingers to deflect from the null position, and electrically measuring the forced deflection so caused.

In accordance with this disclosure, in the first mode of operation the proof mass and the moveable capacitive electrode fingers may deflect freely under an applied acceleration. The deflection of the proof mass including the moveable electrode fingers is electrically measured, allowing the applied acceleration to be determined. This corresponds to a standard mode of operation of an open loop accelerometer, in which there are no electrostatic rebalance forces applied.

However, in accordance with this disclosure the method further provides a second mode of operation in which electrostatic forces are used to force a predictable deflection of the proof mass including the moveable capacitive electrode fingers away from the null position, which can then be electrically measured to test sensitivity during use. The second mode of operation represents a built-in test (BIT), which can allow the sensitivity of the accelerometer to be tested in situ. It has been recognised that such a BIT can be carried out using the existing sensing structure, e.g. in a MEMS device, and that no extra transducers or mechanical parts are required. By applying additional electrostatic forces to the existing transducers, i.e. the fixed capacitive electrode fingers, the sensitivity can be tested. This can allow for detection of a sensitivity error due to a mechanical change in the accelerometer (e.g. a damaged electrode finger or support leg) and/or due to a process channel sensitivity error.

It will be appreciated that the disclosed second mode of operation can be distinguished from closed loop operation modes, in which electrostatic rebalance forces are applied to the fixed electrode fingers of an accelerometer to cause a deflection which is continuously returning the moveable electrode fingers to the null position.

In examples of the disclosed method, the second mode of operation comprises comparing said forced deflection to an expected deflection for said applied electrostatic forces. If the forced deflection is not within a predefined range of tolerance of the expected deflection, it may be determined that the capacitive accelerometer does not have the required sensitivity, for example the device may have become damaged during use. If this happens, an alert can be produced, for example indicating that the accelerometer should be repaired or replaced. The expected deflection for comparison may be calculated from the electrostatic force applied as, if the accelerometer is operating correctly, the input and output should be the same (within expected tolerances).

In a set of examples, the electrostatic forces are applied to all of the fixed electrode fingers at the same time. However, in an alternative set of examples, electrostatic forces are applied to a subset of fixed electrode fingers. The BIT may therefore apply the electrostatic forces to a subset of the fixed electrode fingers in turn, testing a a part of the proof mass at a time. This may increase the ease with which a faulty electrode finger or support leg is detected, as the test is localised each time.

In order to electrically measure the applied acceleration in the first mode of operation, a constant drive signal, for example a 50:50 square wave or a sine wave, may be applied to the accelerometer. The drive waveform is chosen such that the proof mass remains in the null position when there is no applied acceleration. The drive signal does not change the overall position of the proof mass including the moveable fingers, which are free to deflect from the null position under an applied acceleration. The drive signal causes a voltage to be applied between the fixed and moveable electrode fingers, causing them to form an effective capacitor, the capacitance of which is changed when the proof mass and moveable electrode fingers deflect. This causes an output voltage across the capacitor to change, which can then be sampled in order to determine the capacitance, and therefore the deflection of the proof mass including the moveable electrode fingers. As the deflection is proportional to the applied acceleration, this can therefore be measured electrically by a suitable pickoff circuit. The drive signal applied to the accelerometer in the first mode of operation does not force a deflection of the proof mass including the moveable electrode fingers from the null position. Furthermore, it does not force the accelerometer back to the null position, as in closed loop operation of an accelerometer where rebalancing forces are applied.

In a set of examples, electrical measurement in the first mode of operation comprises applying a DC offset voltage to the proof mass. This may be used to prevent electrostatic forces being produced if the gaps between the electrode fingers are not equal. For example, the DC offset voltage may be set to equal to the average value of the drive voltage when it has a mark:space ratio of 50:50. This removes any electrostatic force, allowing the deflection of the proof mass and moveable electrode fingers to be set by the mechanical properties of the proof mass. Applying such a DC offset voltage to the proof mass causes equal and opposite electrostatic forces to be applied between the proof mass and the two sets of fixed electrode fingers because the average voltage of both set of fixed electrode fingers is equal when the mark space ratio is the same.

The DC offset voltage may be set by a restoring circuit connected between the output of the pickoff circuit (e.g. a pickoff amplifier) and the proof mass. In addition, the pickoff electronics may use a DC reference voltage. The DC reference voltage may be set equal to the DC offset voltage applied to the proof mass. Only a voltage difference caused by a free deflection of the proof mass under an applied acceleration will then be measured by the pickoff electronics in the first mode of operation.

In a set of examples, electrical measurement in the second mode of operation comprises adjusting the DC reference voltage for the pickoff circuit, for example reducing the DC reference voltage for the pickoff circuit to 0V. The DC reference voltage may be adjusted by a reference control circuit connected to the pickoff circuit. Adjusting the DC reference voltage in turn adjusts the DC offset voltage on the proof mass e.g. as set by the restoring circuit. Reducing the offset voltage to 0V allows electrostatic forces to be applied in order to cause a forced deflection of the proof mass and moveable electrode fingers. This allows the dynamics of the proof mass to be set by mechanical stiffness etc. and not influenced by any electrostatic effects otherwise present during normal open loop operation.

In a set of examples, the DC offset voltage may be set as 0V in both the first and second modes of operation. However, in the first mode of operation this may cause the sensitivity of the accelerometer to not be equal to that caused by the mechanical properties alone. During operation of the accelerometer, the reference control circuit may therefore switch the reference voltage between a first value $V_{cm}$ in the first mode and a second, different value $V_{ss}$ in the second mode. The second value $V_{ss}$ may be substantially 0V.

The reference control circuit may use a sampled output signal from the pickoff circuit (e.g. pickoff amplifier) as an input. The samples may only be taken when a measurement of the forced deflection of the proof mass is taken during the second mode. As a signal with a constant mark:space ratio is applied as an input to the reference control circuit, the DC reference voltage may be updated every cycle, and may provide a faster settling time. This may help to prevent saturation of the pickoff amplifier, as the DC offset voltage and the DC reference voltage may be more closely matched, as the two update at a similar rate due to the presence of the reference control circuit and the restoring circuit.

In examples of the disclosed method, applying electrostatic forces to said fixed capacitive electrode fingers in said second mode of operation comprises applying a pulse width modulation (PWM) drive signal. Applying a PWM drive signal may comprise applying an in-phase PWM drive signal to the first set of fixed capacitive electrode fingers and a corresponding anti-phase PWM drive signal to the second set of fixed capacitive electrode fingers. This changes the electrostatic forces produced by the two sets of electrode fingers so they are no longer equal and opposite and produces a net force which will cause a forced deflection of the proof mass and moveable electrode fingers, e.g. depending on the stiffness of the support legs and the gain of the pickoff transducers. In a set of examples, the PWM drive signal has a mark:space ratio that is constant in time during the second mode. This is unlike the variable mark:space ratio controlled by a feedback loop in a closed loop configuration, which changes depending on the applied acceleration. This constant mark:space ratio may take any value, for example 50:50, 25:75, 10:90. Usually a mark:space ratio of 100:0 is not continually applied as this would prevent measurement of the free deflection in the first mode of operation. The PWM drive signal causes a regular deflection of the proof mass and moveable electrode fingers, with the size of the forced deflection determined by the mark:space ratio. As discussed above, this forced deflection can be electrically measured in order to test the sensitivity of the accelerometer. However, said constant mark:space ratio may not provide sufficient deflection of the proof mass for reliable sensitivity testing across all g ranges. It has been found that a forced deflection equivalent to a free deflection which is caused by an acceleration greater than 5% of the g range of an accelerometer may be needed in order to distinguish a sensitivity test from background noise in a typical MEMS system.

In a set of examples, said PWM drive signal has a mark:space ratio that is varied in time during the second mode. Unlike the variable mark:space ratio controlled by a feedback loop in a closed loop configuration, the mark:space ratio may be varied in a set pattern. However, as is mentioned above, it may be desirable that the mark:space ratio is not extended e.g. beyond 90:10 or 95:5 for all pulses, as this may interfere with electrical measurement of the forced deflection. In a set of examples, the mark:space ratio is varied for x pulses in every y cycles, where $1 \leq x < y$ and $y > 1$. In a further set of examples, the mark:space ratio is 100:0 for said x pulses. By applying a mark:space ratio of 100:0 for every x pulses in every y cycles, the effective mark:space ratio for the y cycles is increased. This allows a larger deflection to be generated for the same operating voltage.

The deflection that can be produced for a set operating voltage is limited by the settling times of the pickoff circuits. A larger mark:space ratio requires the pickoff circuit to have a faster settling time, and in a system with a constant mark:space ratio there may not be enough time provided with a larger mark:space ratio to allow the pickoff output to settle and be measured accurately. Although the requirements for faster settling times could be reduced by instead increasing the amplitude of the PWM drive signals and therefore reducing the required range of the mark:space ratio, this would result in undesirably high circuit power consumption and in addition may not be feasible in a low voltage CMOS process. However, by applying a variable mark:space ratio that is 100:0 for some x pulses in every y cycles as described above, a larger deflection can be created without the requirement for faster settling times or higher voltage drive signals.

For example, in a system which applies a mark:space ratio of 100:0 for every three pulses in four cycles, with the fourth cycle having a mark:space ratio of 75:25, an effective mark:space ratio of 93.8:6.3 is produced, which is higher than could be generated using a constant mark:space ratio at a typical MEMS operating voltage of approximately 3.6 V. Of course, some benefit may also be achieved by applying other mark:space ratios that are not as large as 100:0 but still higher than those allowing for the settling times of the pickoff electronics. For example, the mark:space ratio may be 95:5, 90:10, 85:15 or 80:20 for x pulses in every y cycles. Of course, any combination of such mark:space ratios may be applied to achieve an effective mark:space ratio as desired. Various combinations of pulse sequences can be envisaged that will create different levels of forced deflection.

In a set of examples, in the second mode of operation, said forced deflection is not measured during said x pulses of every y cycles. Measuring the forced deflection during the x pulses would produce incorrect values for the deflection, and therefore would change the apparent sensitivity.

In a set of examples, the PWM drive signal is applied such that an increased deflection in more than one direction is produced. This may be achieved by altering the mark:space ratio of the in-phase and anti-phase PWM drive signals applied to the first and second sets of fixed electrode fingers respectively. For example, an increased mark:space ratio (e.g. 80:20) may cause a deflection in one direction, whereas a corresponding decreased ratio (e.g. 20:80) may cause a deflection in the opposite direction. This may be used to check for any faults (e.g. cracks in the moveable electrode fingers) which may not show up using a deflection in only one direction.

In a set of examples, the second mode of operation applies electrostatic forces arranged to produce a forced deflection equivalent a free deflection which is caused by an applied acceleration of between 10% and 90%, further between 30% and 70%, of the g-range of the accelerometer. This allows the forced deflection caused by the BIT to be easily distinguished over other variation which may be acceptable within device tolerances, for example caused by background noise.

In a set of examples, the second mode of operation may be applied throughout the operation of the accelerometer to test its sensitivity. However, in a set of examples the method further comprises an initial mode of operation applied before the second mode of operation, wherein said initial mode of operation comprises applying a PWM signal with a constant mark:space ratio for a number of cycles, before applying the second mode of operation. The initial mode of operation acts to reduce the overall settling time for the system. By initially applying a constant mark:space ratio, the proof mass and moveable electrode fingers begin to deflect. After a number of cycles, which may for example depend on the mark:space ratio used, the deflection of the moveable fingers may have settled. A variable mark:space ratio can then be applied during the second mode of operation, causing a further forced deflection of the proof mass and moveable electrode fingers.

By causing a small deflection then increasing it at a later stage (by increasing the mark:space ratio in stages), the settling time may be reduced. While the initial use of a 100:0 mark:space ratio may cause saturation of the pickoff electronics and therefore an increased settling time, by initially using a lower mark:space ratio, this saturation can be reduced, decreasing the settling time. During the initial mode of operation, the signal may not be sampled, as this mode of operation is used to reach the desired deflection before a BIT can be carried out, i.e. before the second mode of operation is used. Accordingly the forced deflection may not be measured during the initial mode of operation.

In a set of examples of the disclosed method, the second mode of operation is initiated for a user-commanded applied test (CBit). This may be initialised by a host system, for example at regular intervals and/or when commanded by a user.

In a set of examples, the second mode of operation is applied continuously during operation of the accelerometer. The test mode may be run in the background while the accelerometer is operating, instead of only being run when commanded by a user. In examples such as this, a host system in the accelerometer is only aware of the test mode when there is a problem, i.e. when the forced deflection is not within a predefined interval of the expected deflection. The host system may then receive an alert from the accelerometer electronics, indicating that the sensitivity has changed. This may be taken as an indication that the accelerometer must be repaired or replaced.

In a set of examples, the accelerometer either operates in the first mode of operation or in the second mode of operation. Testing does not take place while an applied acceleration is being electrically measured, and vice versa. In these examples, the forced deflection caused by the applied electrostatic forces is the only deflection of the proof mass and moveable electrode fingers at that time. For example, the first mode of operation may be sequenced to alternate regularly with the second mode, e.g. the second mode applies electrostatic forces for every one in four drive clock cycles.

Additionally or alternatively, the second mode of operation may be applied at the same time as the first mode of operation. In such a situation, the proof mass including the moveable electrode fingers may undergo a free deflection from the null position due to an applied acceleration and in addition a further, forced deflection from the null position due to the electrostatic forces applied by the second mode of operation. The forced deflection may be electrically measured and separated from the free deflection so as to be able to test the sensitivity even when the applied acceleration is being measured concurrently. It may be easier to test the sensitivity concurrently when the applied acceleration is substantially constant for the duration of the second mode of operation.

Whether the modes are alternated or concurrent, the disclosed method can allow for a continuous detection of sensitivity error without affecting normal operation of the accelerometer and altering signal performance.

In a set of examples, the first and second modes of operation have separate signal processing channels. This may make it easier for the two deflections to be measured and processed independently. However, in an alternative set of examples there may only be a single signal processing channel. The signals may be digitised and processed in the digital domain, e.g. to provide separate measurements of the free and forced deflections.

In a set of examples, the first and second modes of operation use a common clock signal. This may allow the clock signal to be tested using the BIT, in order to determine if there is a fault in the clock signal. The common clock signal may be derived from the first mode of operation.

BRIEF DESCRIPTION OF DRAWINGS

One or more non-limiting examples will now be described with reference to the accompanying drawings, in which:

FIG. 4a shows an exemplary drive signal for the first mode of operation;

FIG. 4b shows an exemplary pulse width modulation (PWM) drive signal for use in the second mode of operation; and FIG. 5 shows an alternative PWM drive signal for use in the second mode of operation in accordance with an aspect of the disclosure.

FIG. 1a shows a prior art form of capacitive accelerometer 101 similar to that shown in WO 2005/083451. The accelerometer 101 has a proof mass 102 and four fixed electrodes 104, 106 arranged in two pairs on either side of the proof mass 102. The proof mass 102 is connected to multiple sets of moveable electrode fingers 108. These electrode fingers 108 are interdigitated in an offset manner with corresponding sets of fixed electrode fingers 110, 112 extending from the fixed electrodes 104, 106. The electrode fingers 108, 110, 112 are formed by etching trenches into a silicon substrate. The proof mass 102 also has a set of support legs 114, which extend from the body of the proof mass 102 and are fixed at anchor points 116. The proof mass 102 can move relative to the fixed electrodes 104, 106 in an in-plane sensing direction in response to an applied acceleration. The two sets of fixed electrode fingers 110, 112 are offset from the proof mass fingers 108 in opposite directions, such that a movement in either direction can be measured. These offsets may be equal in size. This offset is parallel to the sensing direction (indicated by the double headed arrow).

Figure 1A:
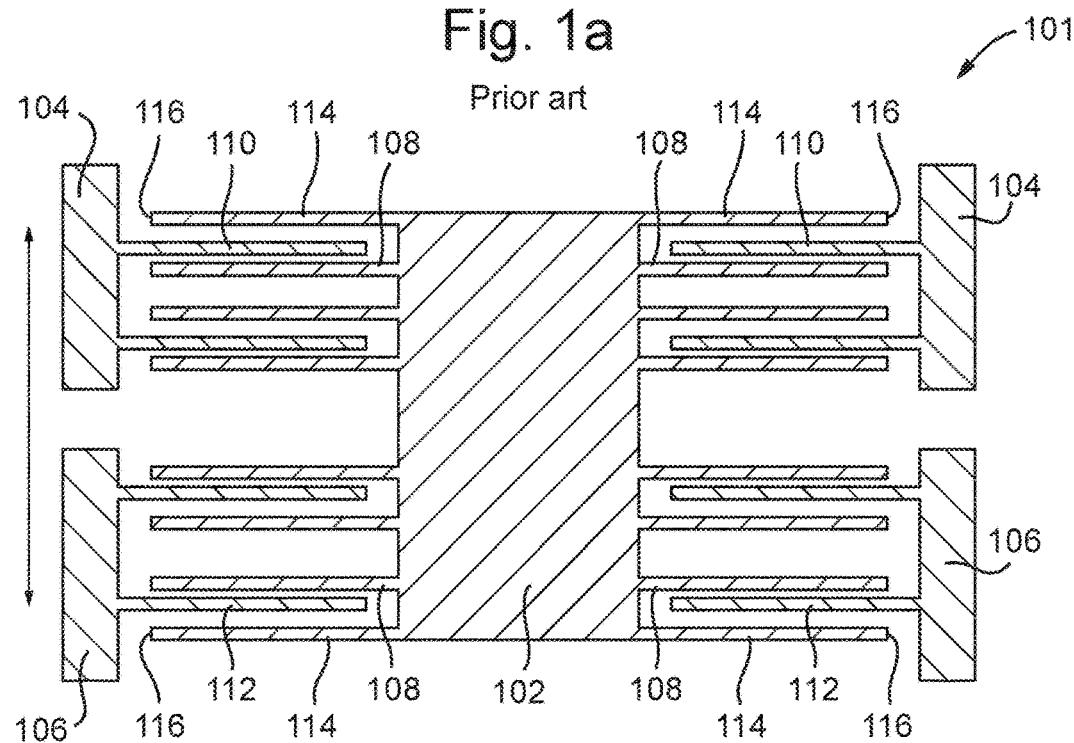
FIGS. 1a and 1b each show a prior art form of accelerometer.

When the accelerometer 101 is used, acceleration will cause the proof mass 102 and its electrode fingers 108 to move in the sensing direction relative to the fixed electrodes 104, 106. In open loop operation, this causes a change in the offset between the proof mass fingers 108 and the fixed electrode fingers 110, 112. This change can be used to calculate the acceleration, as it will cause a change in the differential capacitance of the system. The acceleration can only be measured in the sensing direction, i.e. perpendicular to the electrode fingers 108, 110, 112, as it is the movement of these fingers changing the relative offset which allows the acceleration to be measured.

Figure 1B:
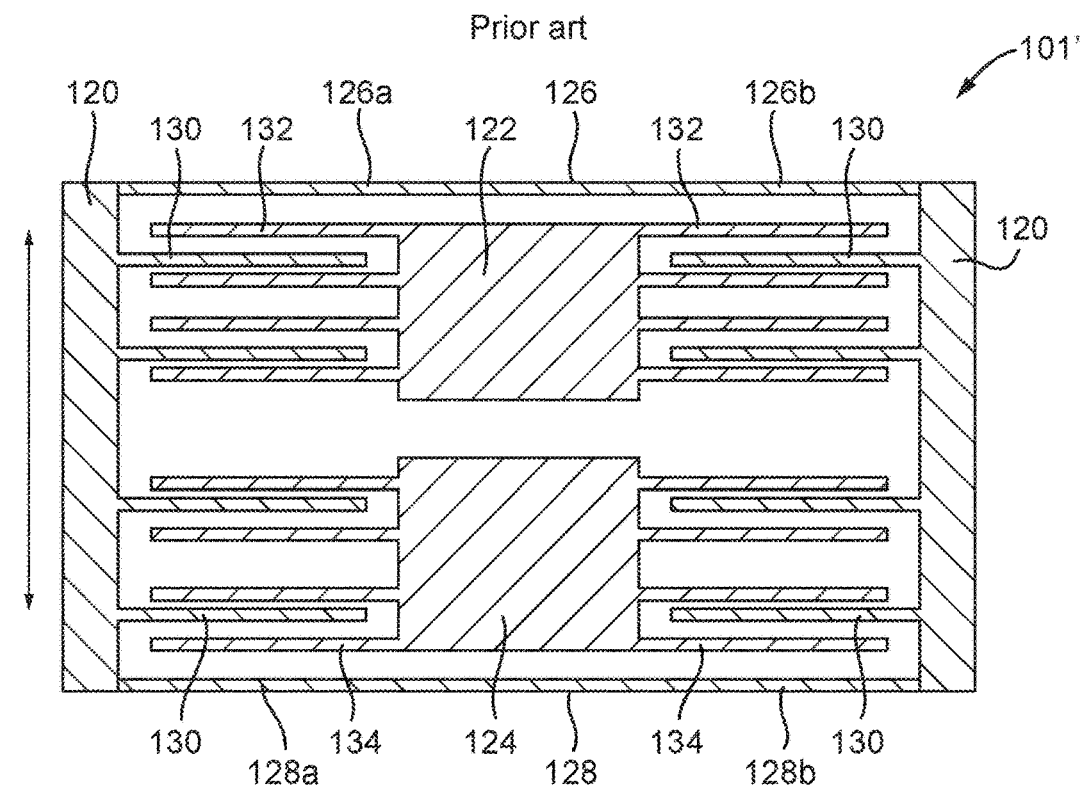

FIG. 1b shows an alternative form of prior art accelerometer. Here, the proof mass 120 takes the form of an outer frame of the accelerometer, with the fixed electrodes 122, 124 being internal to the frame. This is a reversal of the arrangement of FIG. 1a. The proof mass frame 120 is supported on flexible legs 126a, 126b, 128a, 128b which are anchored at two central points 126, 128, above and below the fixed electrodes 122, 124. Extending from the frame 120 are a number of moveable electrode fingers 130, which are interdigitated with the fixed electrode fingers 132, 134 extending from the fixed electrodes 122, 124 in an offset manner. As in FIG. 1a, the electrode fingers 130, 132, 134 are offset parallel to the sensing direction (shown by the double headed arrow), by approximately the same distance but in opposite directions.

Figure 2:
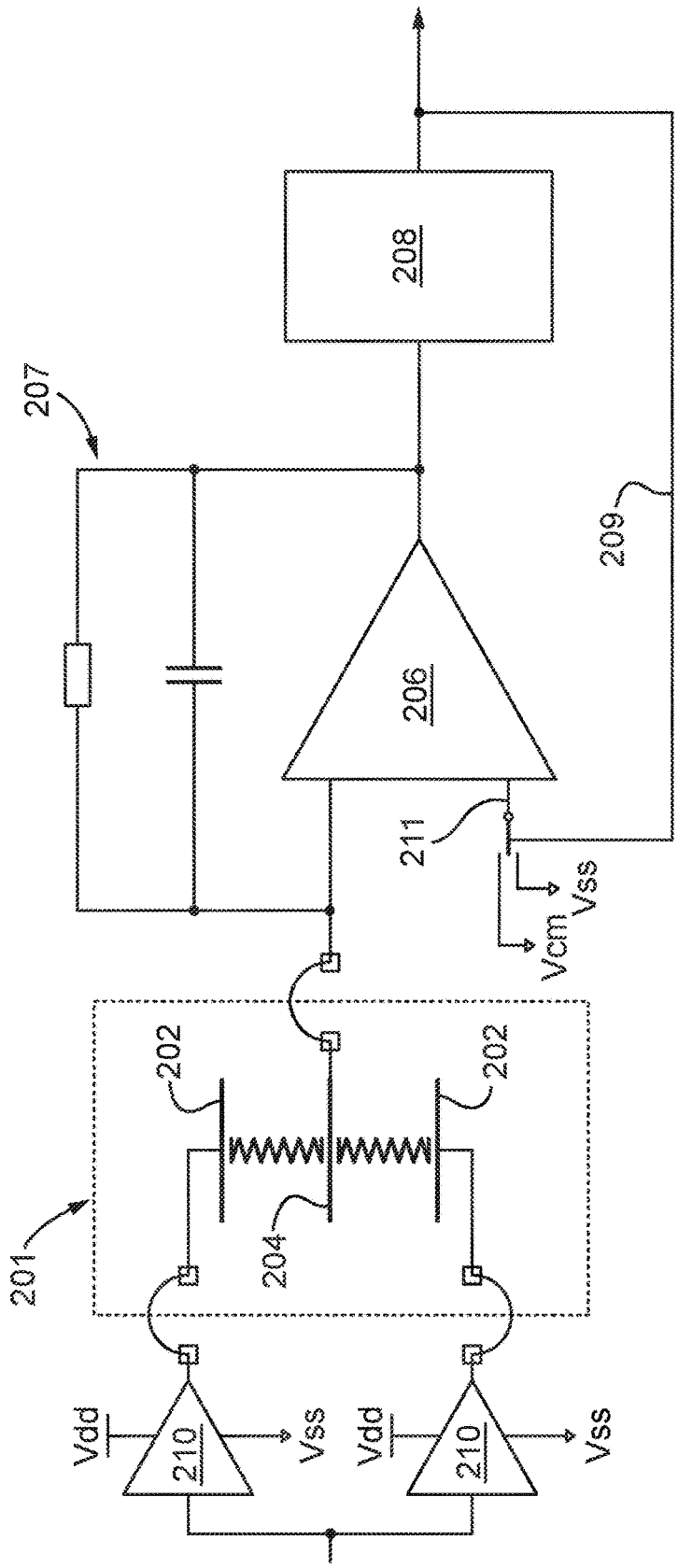
FIG. 2 shows a schematic diagram of an accelerometer system in accordance with the disclosure.

FIG. 2 shows a schematic diagram of an accelerometer system in accordance with the invention. An accelerometer sensing structure 201 contains fixed electrodes 202 having electrode fingers interdigitated with the moveable electrode fingers of a proof mass 204 (shown here schematically as a spring mass system). The moveable electrode fingers of the proof mass 204 are connected to a pickoff amplifier 206, which is connected to processing unit 208. A restoring circuit 207 is connected between the output of the pickoff amplifier 206 and the proof mass 204. This is a standard configuration for an open loop accelerometer, and is used in a first mode of operation. In addition, two drive amplifiers 210 are connected to the fixed electrodes 202, in order to both allow measurements to take place in the first mode and to provide electrostatic forces for a second mode of operation. A reference control circuit 209 creates a feedback loop between the output of the processing unit 208 and a reference voltage input 211 to the pickoff amplifier 206. The reference voltage input 211 can be switched between a standard reference voltage $V_{cm}$ in the first mode and an adjusted reference voltage $V_{ss}$ in the second mode.

In use, in the first mode of operation the proof mass 204 is free to move under an external applied acceleration. The method of driving the accelerometer is discussed with reference to FIG. 4a, which demonstrates an open loop drive signal in the form of a 50:50 square wave. In addition, the restoring circuit 207 may be used to apply a DC offset voltage to the proof mass 204. The pickoff amplifier 206 compares the open loop pickoff voltage from the proof mass 204 to the reference voltage $V_{cm}$, which is set to be equal to the DC offset voltage. The pickoff amplifier 206 samples the output voltage from the accelerometer (i.e. the offset voltage) in order to determine whether the proof mass 204 has been deflected from a null position. The offset voltage and the reference voltage $V_{cm}$ are controlled to have the same amplitude when there is no applied acceleration. The pickoff amplifier 206 is set to a reference voltage $V_{cm}$ which is nominally the same as the average voltage of the 50:50 drive signals. This removes any electrostatic forces that may be produced by unequal gaps between the electrode fingers. The difference between the offset voltage and the reference voltage $V_{cm}$, as determined by the pickoff amplifier 206, is proportional to the applied acceleration, and therefore can be used to determine the applied acceleration in open loop. The sampled output voltage is processed in the processing unit 208, before being output by the system.

In accordance with this disclosure, in the second mode of operation the pickoff amplifier 206 has its input offset to $V_{ss}$ so that the two drive amplifiers 210 can apply different voltages $V_{dd}$ to the proof mass including the fixed electrodes 202. This causes a forced deflection of the proof mass and moveable electrode fingers 204, which can then be measured using the pickoff amplifier 206, by determining the difference between the pickoff voltage from the proof mass 204 and the reference voltage $V_{ss}$, and the processing unit 208 as in the first mode of operation. The reference voltage can be switched from $V_{cm}$ to $V_{ss}$ using the reference control circuit 209. This in turn changes the offset voltage on the proof mass 204.

The switch from $V_{cm}$ to $V_{ss}$, allowing the application of electrostatic forces to deflect the proof mass and moveable finger 204, could cause the pickoff amplifier 206 output to saturate. The system initially operates in a mode of operation where in-phase and anti-phase PWM drive signals are applied that have a mark:space ratio staying constant in time, e.g. 25:75. The use of a fixed PWM state prior to applying a variable mark:space ratio in the second mode that is 100:0 for some x pulses in every y cycles (as explained in more detail below) allows the pickoff amplifier DC restoring circuit 207 to sample and update every cycle, therefore reducing the settling time compared to switching directly to a variable mark:space for PWM drive signals applied in the second mode. The reference control circuit 209 is used to change the reference voltage to $V_{ss}$ when the second mode of operation is in use.

Both the free and forced deflections are measured, and depending on the mode of operation they will be processed in different ways. All of the processing is carried out by the same processing unit 208, as the free deflection and the forced deflection can be separated during processing. This processing may occur in the digital domain. A suitable demodulation and detection scheme is used, in order to determine the different deflection directions.

Once the forced deflection has been determined in the second mode, this can be compared to a reference deflection. This may be carried out in a number of different ways, for example comparing to a database of expected values, or comparing the output voltage directly to the input voltage. The method of comparing to a reference value depends on the system in use, as different tolerances are required in different systems. If the measured forced deflection is within a tolerated range of the expected deflection, the accelerometer is deemed to work correctly. However, if the measured forced deflection is outside the tolerances, it is presumed that there is a problem with the accelerometer, e.g. a cracked support leg, and an alert is produced indicating that the accelerometer must be repaired or replaced. Each comparison takes into account background noise in order to reduce the number of false alarms. A shared processing unit can be easily used when a commanded BIT (CBit) is used, as there are defined times at which the free deflection is measured (i.e. the first mode), and defined times at which the forced deflection is measured (i.e. the second mode).

Figure 3:
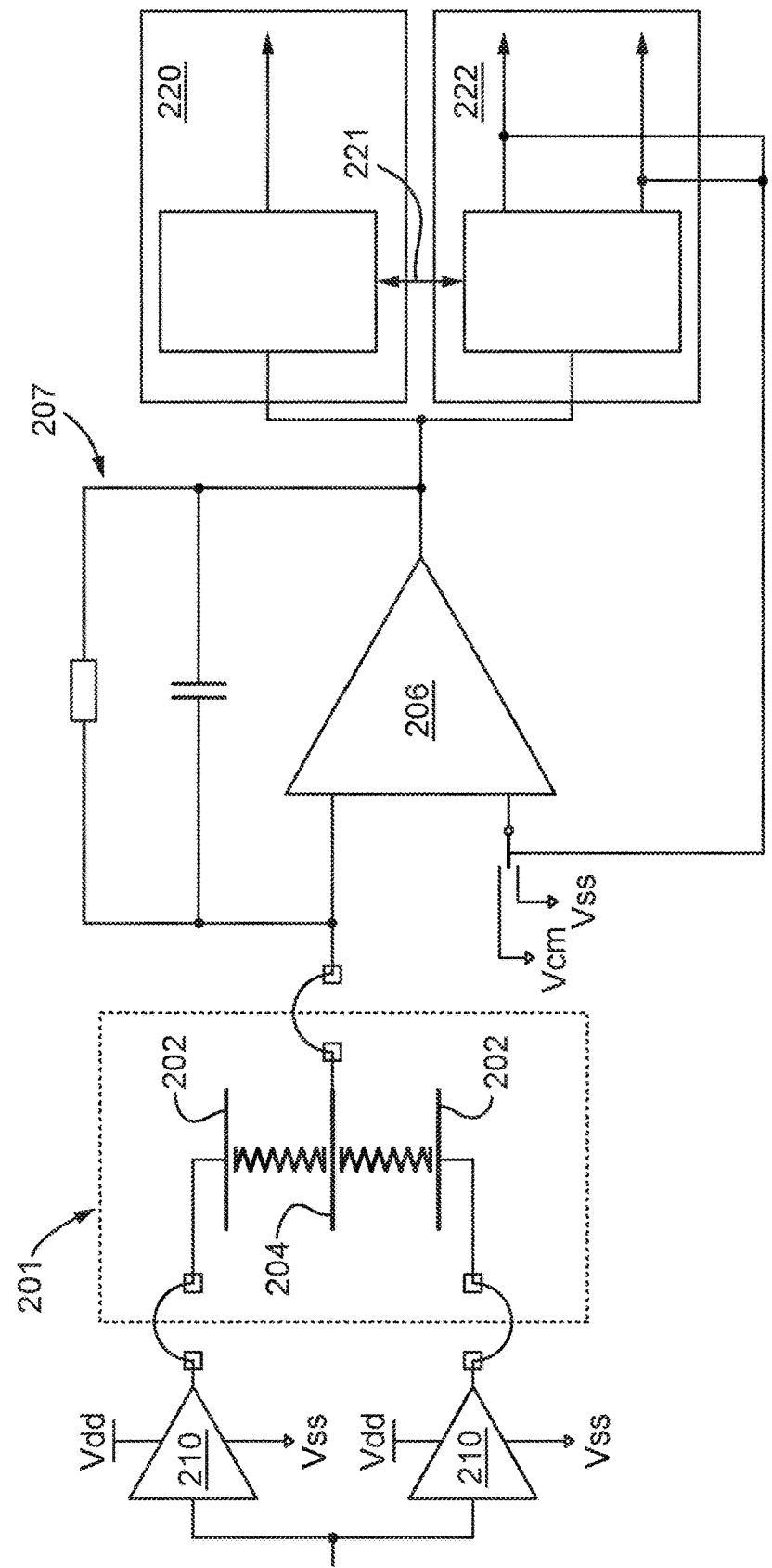
FIG. 3 shows a schematic diagram of an alternative accelerometer system in accordance with the disclosure.

FIG. 3 shows a schematic diagram of an alternative accelerometer system. While the basic arrangement is the same as in FIG. 2, in this example there are two processing units 220 and 222. In use, the signals measured by the pickoff amplifier 206 are processed separately, with those from the first mode of operation processed by unit 220, and those from the second mode of operation processed by unit 222. Each processing unit 220, 222 is held while the other processing channel is in operation, in order to ensure that the BIT of the second mode of operation is separate from the free deflection, as any mixing between the two could cause both false alarms for the BIT and incorrect measurement of the applied acceleration. This is particularly important when the two modes of operation run concurrently, with the BIT operating for example every four cycles. Control signals 221 are used to communicate between the two processing units 220, 222 and to control which of the two processing units 220, 222 are in operation.

FIG. 4a shows an exemplary drive signal which may be used to take measurements in the first mode of operation. A square wave signal with a mark:space ratio of 50:50 is used, with an in-phase signal driving the first drive amplifier, and an anti-phase signal driving the second drive amplifier. As the mark:space ratio of the square wave signals is 50:50, the accelerometer is in a null position, with the proof mass 302 equally spaced between the fixed electrodes 304. The amplitude of the drive signal will not alter the position of the proof mass 302, as this is determined by the mark:space ratio of the signal. This drive signal can be used for the first mode of operation, as it does not prevent the proof mass 302 from deflecting under an applied acceleration. By applying a square wave signal to the accelerometer, a voltage is applied across the electrode fingers, causing them to form an effective capacitor. When the proof mass 302 deflects, the separation between the capacitor plates is altered, causing the voltage between the electrodes 302, 304 to change. By sampling the output voltage, the capacitance and therefore the deflection of the proof mass 302 can be determined, as the measured voltage can be compared to a reference voltage when the accelerometer is in a null position.

FIG. 4b shows an exemplary drive signal which may be used to apply electrostatic forces in the second mode of operation. In this drive signal, three different mark:space ratios are shown, which demonstrate how different positions of the proof mass 308, 316, 322 could be tested. The drive signal is a PWM drive signal, which is in-phase for the first drive amplifier and in anti-phase for the second drive amplifier. The PWM mark:space ratio does not stay constant but varies in time. The drive signal is initially at a mark:space ratio of 50:50, which is a standard drive signal maintaining the null position, as discussed for FIG. 4a. However, at time 306, the mark:space ratio is altered to 25:75 for a cycle. This causes a forced deflection of the proof mass 308. The electrostatic forces from the PWM drive signals causes the proof mass 308 to deflect, and move closer to fixed electrode 310 than fixed electrode 312. This allows the built-in test (BIT) to test the deflection of the proof mass in one direction. At time 314, the PWM drive signal returns to a mark:space ratio of 50:50, allowing the proof mass 316 to return to a null position, being equally spaced between fixed electrode fingers 318. At time 320, the deflection of the proof mass 322 is tested in the opposite direction. The PWM drive signal has a mark:space ratio of 75:25 for a cycle, causing the proof mass 322 to move in the opposite direction, becoming closer to fixed electrode 324 than fixed electrode 326. By carrying out a BIT with a number of different mark:space ratios, it is possible to test the deflection of the proof mass in more than one direction. However, a PWM drive signal such as this only allows a short settling time for the accelerometer, which puts a limit on the maximum mark:space ratio which can be used.

FIG. 5 shows another exemplary drive signal which may be used to apply electrostatic forces in the second mode of operation, which allows for a higher maximum mark:space ratio to be used. There are two waveforms shown in FIG. 5, one showing the PWM drive signals 400, and the other showing the sampling 402 of said drive signals. The system initially operates in a third mode of operation, using in-phase and anti-phase PWM drive signals 404 which have a constant mark:space ratio of 25:75, as demonstrated in FIG. 4b at time 306. This mark:space ratio is used to cause an initial forced deflection of the proof mass. By applying a constant mark:space ratio initially, the proof mass and moveable electrode fingers begin to deflect. After a number of cycles 404, only one of which is shown here, the proof mass has had time to settle into a deflected position. At this stage, the mark:space ratio can be increased, in order to cause a larger forced deflection. A higher mark:space ratio of 100:0 is applied for three pulses 406, before a single pulse 404 at the original mark:space ratio is applied. The system can then move into the second mode of operation, repeating this pattern of three pulses 406 at 100:0 and one pulse 404 at 25:75 in the PWM drive signal. This causes an average mark:space ratio of 6.3:93.8, creating a larger deflection of the proof mass.

Once the system is in the second mode of operation, the forced deflection can then be sampled and sensitivity therefore tested. Waveform 402 shows the pickoff sampling of the proof mass. In the second mode of operation, when there is a mark:space ratio as demonstrated in FIG. 4a or 4b, i.e. a mark:space ratio of less than 100:0 in which there is sufficient settling time for a regular pulse, the pickoff signal is sampled every pulse. However, when a PWM drive signal as demonstrated in FIG. 5 is used, the pickoff amplifier does not sample during the pulses with a mark:space ratio of 100:0. These pulses would not give a representative measurement of the deflection, as the signals would be saturated due to the settling times required. The pickoff amplifier only samples at the beginning and end of each 25:75 pulse, which allows the deflection of the proof mass including the moveable electrode fingers to be sufficiently measured for the BIT.

The invention claimed is:

1. A method for open loop operation of a capacitive accelerometer, the capacitive accelerometer comprising:
    a substantially planar proof mass mounted to a fixed substrate by flexible support legs so as to be linearly moveable in an in-plane sensing direction in response to an applied acceleration;
    first and second sets of moveable capacitive electrode fingers extending from the proof mass, substantially perpendicular to the sensing direction and spaced apart in the sensing direction; and
    first and second sets of fixed capacitive electrode fingers extending substantially perpendicular to the sensing direction and spaced apart in the sensing direction;
    wherein the first set of fixed capacitive electrode fingers is arranged to interdigitate with the first set of moveable capacitive electrode fingers and the second set of fixed capacitive electrode fingers is arranged to interdigitate with the second set of moveable capacitive electrode fingers;
    wherein a null position is defined as a spacing of the interdigitated fixed and moveable capacitive electrode fingers when the applied acceleration is zero;
    the method comprising:
    a first mode of operation which comprises electrically measuring a deflection of the proof mass including the moveable capacitive electrode fingers from the null position under an applied acceleration;
    a second mode of operation which comprises applying electrostatic forces to said first and second sets of fixed capacitive electrode fingers, in order to cause said proof mass including the first and second sets of moveable capacitive electrode fingers to deflect from the null position, and electrically measuring the forced deflection so caused, wherein applying said electrostatic forces to said fixed capacitive electrode fingers in said second mode of operation comprises applying an in-phase PWM drive signal to the first set of fixed capacitive electrode fingers and a corresponding anti-phase PWM drive signal to the second set of fixed capacitive electrode fingers; and applying a PWM drive signal with a mark-to-space ratio that is varied in time during the second mode.

2. A method as claimed in claim 1, wherein the second mode of operation comprises adjusting a DC reference voltage applied to a pickoff circuit that is electrically measuring the forced deflection.

3. A method as claimed in claim 2, comprising sampling an output signal from the pickoff circuit in order to adjust the DC reference voltage.

4. A method as claimed in claim 2, wherein the DC reference voltage is adjusted to 0V during the second mode.

5. A method as claimed in claim 1, wherein the second mode of operation comprises comparing said forced deflection to an expected deflection for said electrostatic forces.

6. A method as claimed in claim 1, wherein the mark-to-space ratio is varied for x pulses in every y cycles, where $1 \leq x < y$ and $y > 1$.

7. A method as claimed in claim 6, wherein the mark-to-space ratio is 100:0 for said x pulses.

8. A method as claimed in claim 6, wherein said forced deflection is not measured during said x pulses of every y cycles.

9. A method as claimed in claim 1, comprising an initial mode of operation before the second mode of operation, wherein said initial mode of operation comprises applying a PWM signal with a constant mark-to-space ratio for a number of cycles.

10. A method as claimed in claim 1, further comprising:

initiating the second mode of operation for a user-commanded applied test (CBit).

11. A method as claimed in claim 1, further comprising:

applying the second mode of operation continuously during operation of the accelerometer.

* * * * *